US011975233B2

(12) United States Patent
Sakany

(10) Patent No.: US 11,975,233 B2
(45) Date of Patent: May 7, 2024

(54) CHAIR EXERCISER

(71) Applicant: Ellen Sakany, Boulder, CO (US)

(72) Inventor: Ellen Sakany, Boulder, CO (US)

( * ) Notice: Subject to any disclaimer, the term of this patent is extended or adjusted under 35 U.S.C. 154(b) by 532 days.

(21) Appl. No.: 16/989,800

(22) Filed: Aug. 10, 2020

(65) Prior Publication Data

US 2021/0260431 A1 Aug. 26, 2021

Related U.S. Application Data

(60) Provisional application No. 62/981,488, filed on Feb. 25, 2020.

(51) Int. Cl.

| | |
|---|---|
| ***A63B 21/02*** | (2006.01) |
| ***A47C 9/00*** | (2006.01) |
| ***A61H 1/00*** | (2006.01) |
| ***A63B 21/00*** | (2006.01) |
| ***A63B 21/16*** | (2006.01) |
| ***A63B 24/00*** | (2006.01) |

(52) U.S. Cl.

CPC .......... *A63B 21/1609* (2015.10); *A47C 9/002* (2013.01); *A61H 1/005* (2013.01); *A63B 21/00058* (2013.01); *A63B 24/0062* (2013.01); *A61H 2230/06* (2013.01); *A61H 2230/30* (2013.01); *A61H 2230/80* (2013.01); *A63B 2230/01* (2013.01); *A63B 2230/04* (2013.01); *A63B 2230/30* (2013.01); *A63B 2230/75* (2013.01)

(58) Field of Classification Search

CPC ............................ A63B 21/1609; A47C 9/002

See application file for complete search history.

(56) References Cited

U.S. PATENT DOCUMENTS

| | | | | |
|---|---|---|---|---|
| 6,461,283 | B1 * | 10/2002 | Maron | A63B 21/023 482/129 |
| 7,481,739 | B2 * | 1/2009 | Takizawa | A63B 23/03541 482/8 |
| 9,968,818 | B1 * | 5/2018 | Vargas | A63B 21/4047 |
| 2003/0109365 | A1 * | 6/2003 | Smith | A63B 26/003 482/121 |
| 2007/0252419 | A1 * | 11/2007 | Takahashi | A47C 3/025 297/312 |
| 2010/0036297 | A1 * | 2/2010 | Kim | A61H 23/0236 601/49 |
| 2016/0089059 | A1 * | 3/2016 | Hu | A61B 5/7207 600/595 |

FOREIGN PATENT DOCUMENTS

| | | | |
|---|---|---|---|
| AU | 2017101323 | A4 * | 11/2017 |
| CN | 203915926 | U * | 11/2014 |
| JP | 2007143797 | A * | 6/2007 |
| KR | 20120045523 | A * | 10/2010 |

* cited by examiner

*Primary Examiner* — Joshua T Kennedy

(57) ABSTRACT

The Chair Exerciser is an apparatus and method to exercise one's core, back, and legs while working on tasks that are normally performed seated. These tasks include computer work, watching television, or computer gaming. The Chair Exerciser fits on a regular chair and one sits upon it. The Chair Exerciser's resistance can be adjusted to the suit the needs of the user. The multitasking of work and exercise is an attractive benefit to the Chair Exerciser. The Chair Exerciser can also be formed as an integral part of the chair as opposed to a portable unit.

14 Claims, 8 Drawing Sheets

CHAIR EXERCISER

The present applications claim priority to the earlier filed provisional application having Ser. No. 62/981,488 and hereby incorporates subject matter of the provisional application in its entirety.

DESCRIPTION

Background

Modern human work has evolved significantly over the past 100 years from tasks that require physical exertion such as farming to work that requires long hours of sitting at a desk. With the onset of computers, automation, and home entertainment, sitting for long periods of time has become a reality of modern life.

Many studies have shown that sitting long periods of time is dangerous to one's health and can cause many health problems such as obesity, high blood pressure, and back and muscle distress.

Presently, most people working in an office sit for eight hours or longer per day. In addition, many people spend four to eight hours at home watching television without the opportunity to exercise. Some companies offer employees exercise facilities and breaks, however the time available to exercise is limited. Standing desks and inflatable seat cushions do not enable active exercise while in use. Consequently, there is a vital need for a simple device to provide exercise while sitting, working at a desk or for other seated situations.

SUMMARY

The Chair Exerciser allows users to exercise their core, back, and legs while working on tasks that are normally performed seated. These tasks include computer work, watching television, or computer gaming. The Chair Exerciser fits on a regular chair and one sits upon it. The Chair Exerciser can be adjusted to the suit the weight of the user. It enables repetitive resistive motion to exercise the core, legs, back, and thighs, while the user can continue to perform activities such as typing, phone use, watching television, or playing computer games. The multitasking of work and exercise is an attractive benefit to the Chair Exerciser. The Chair Exerciser can also be formed as an integral part of the chair as opposed to a portable unit.

The present invention is directed toward a method for manufacturing of an Adjustable Chair Exerciser that fits on the seat of the chair.

The present invention is also directed toward a Chair Exerciser that can be positioned onto the back of a chair using straps or Velcro.

The present invention is also directed toward a method for manufacturing a chair with an integrated Exerciser.

BRIEF DESCRIPTION OF THE DRAWINGS

The invention, together with further advantages thereof, may best be understood by reference to the following descriptions, taken in conjunction with the accompanying drawings, with their accompanying descriptions, in which similar reference characters refer to similar parts, and in which.

DESCRIPTION

Figure 1:
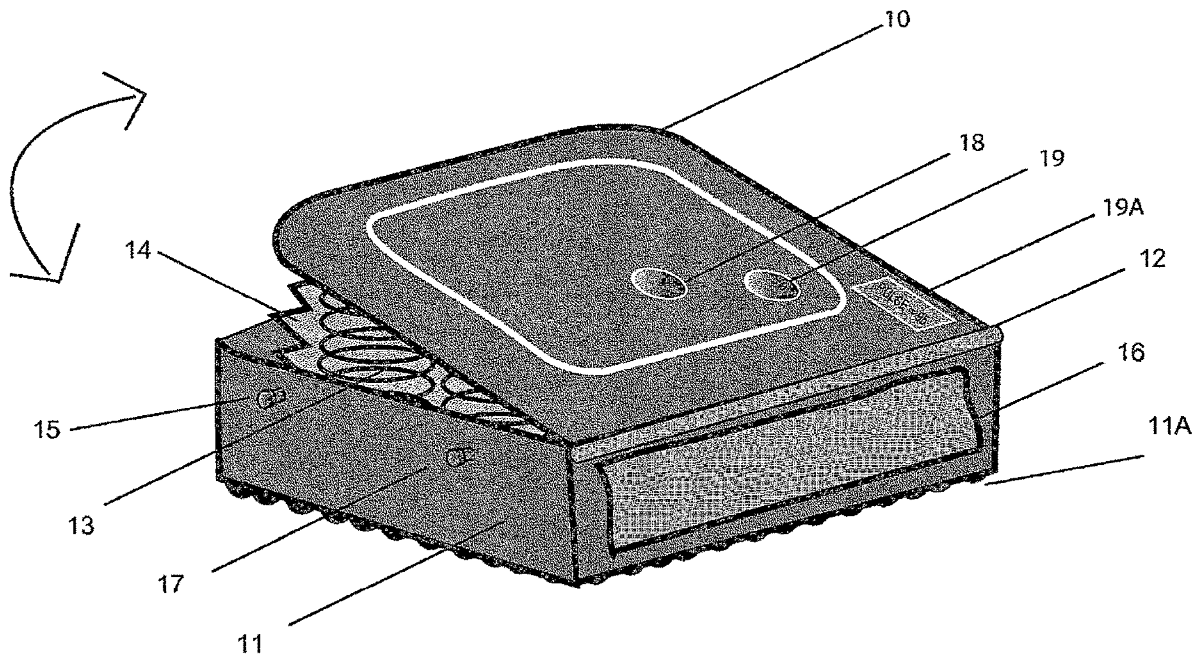
FIG. 1 is a diagram of one embodiment of an Adjustable Chair Exerciser

FIG. 1 is a simplified schematic view of one embodiment of a Chair Exerciser. The seat 10 is where the subject sits while exercising and, at the same time, working. The Chair Exerciser base 11 is configured to be placed on the current chair seat and supports the subject whereas the seat 10 moves in an up/down arcuate motion. The Chair Exerciser seat rotates around the pivot 12. The spring 13, provides the support resistance in the downward motion and, during the upward assist, the subject moves in the upward direction. The bladder 14 provides air compression during the downward motion of the seat. The valve 15 provides adjustment for the resistance and motion speed, depending on the subject's weight and desired exercising effort in one embodiment. The Chair Exerciser may include an air reservoir 16 and pressure valves 17 to provide additional control and adjustments to assist the spring during the upward motion. The seat 10 may include cushioning material to improve comfort. The base 11, may include non-slip function 11A such as extrusion, gripping material or straps. The Chair Exerciser may include vital sign sensor 18 and activity counter 19 and display 19A.

Figure 2:
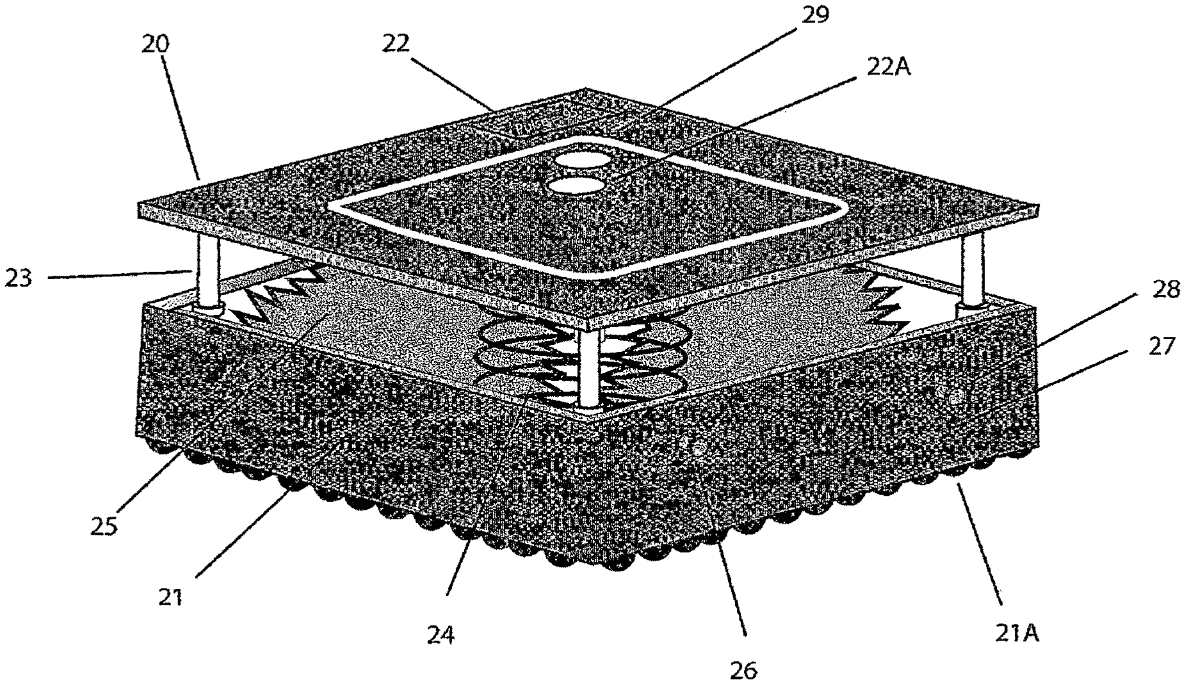
FIG. 2 is a diagram of second embodiment of an Adjustable Chair Exerciser

FIG. 2 is a simplified schematic view of second embodiment of a Chair Exerciser. The seat 20 is where the subject sits while exercising and/or working. The Chair Exerciser base 21 is configured to be placed on the current chair seat and supports the subject, whereas the seat 20 moves in up/down vertical motion. The base 21 can be placed or made at any angle to provide the subject comfort. The Chair Exerciser seat moves up/down using the guides 23. The spring 24 provides the support resistance in the downward motion and during upward motion, assists the subject to move in the upward direction. The bladder 25 provides air compression during the downward motion of the seat. Valve 26 provides adjustment for the resistance and motion speed depending the subject weight and desired exercise effort. In one embodiment, the Chair Exerciser also includes air reservoir 27 and pressure valves 28 to provide additional control and adjustments to assist the spring during the upward motion.

The seat 20 may include cushioning material to improve comfort. The base 21 may include non-slip function such as extrusion, gripping material 21A or straps to conform to the seat and prevent sliding. The Chair Exerciser may include vital sign sensor 29 and activity counter 22A and display 22.

Figure 3:
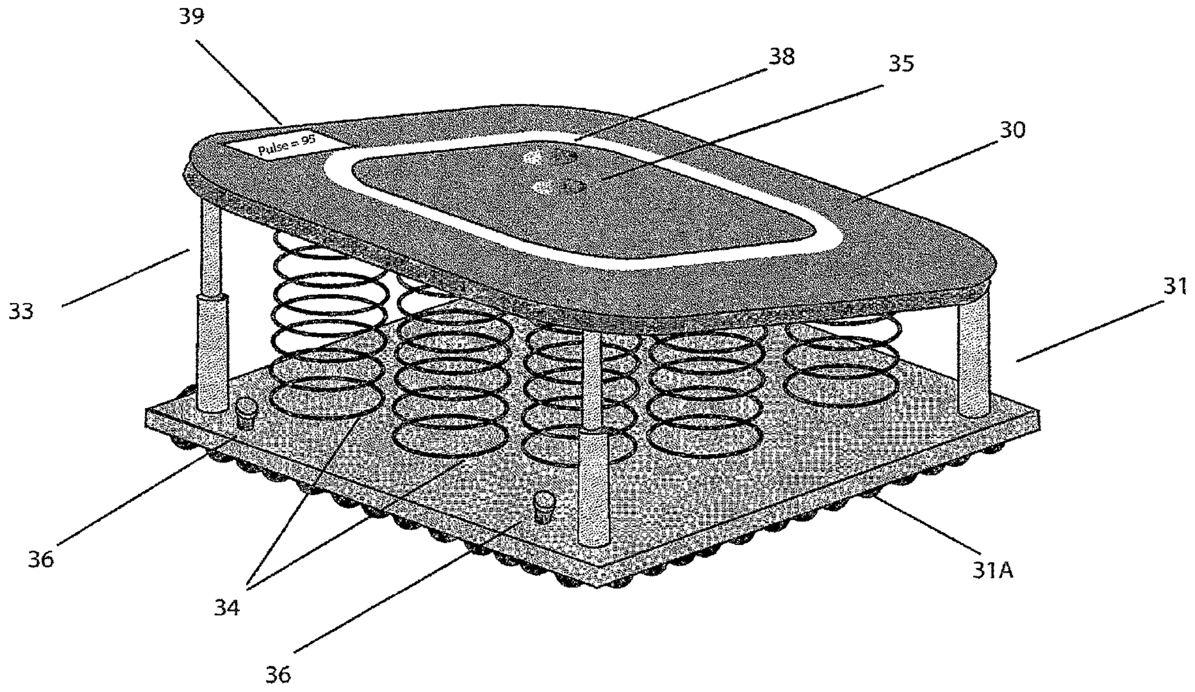
FIG. 3 is a diagram of third embodiment of an Adjustable Chair Exerciser

FIG. 3 is a simplified schematic view of a second embodiment of a Chair Exercise. The seat 30 is where the subject sits on while exercising and/or working. The Chair Exerciser base 31 is configured to be placed on the current chair seat and support the subject whereas the seat 30 moves in up/down in a vertical motion. The base 31 can be placed or made at any angle to enable the subject's comfort. The Chair Exerciser seat moves up/down using the guides 33. The spring 34, provides support and resistance in the downward motion during the upward assists, the subject in moving in the upward direction. The springs' force has means to adjust and control the desired downward and upward motion 36. The seat 30 may include cushioning material to improve comfort. The base 31 may include non-slip features such as extrusion, gripping material 31A, or straps to conform to the seat and prevent sliding. The Chair Exerciser may include vital sign sensor 35, activity counter 38, and display 39.

Figure 4:
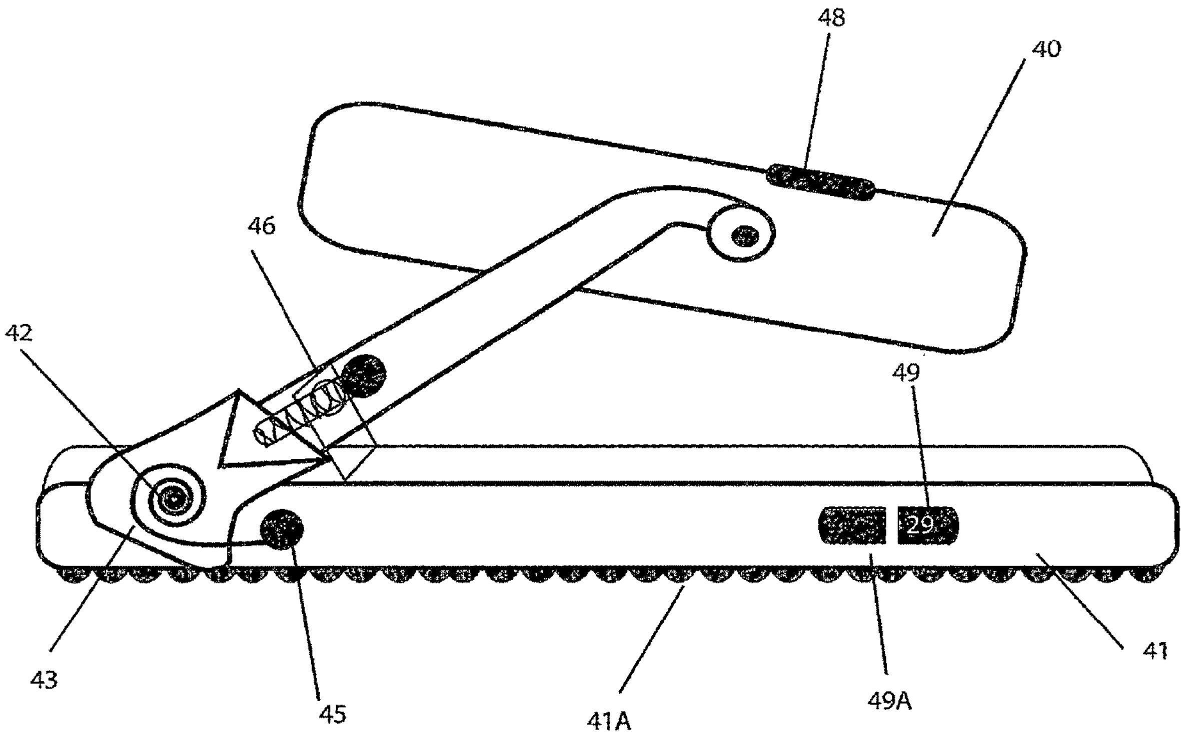
FIG. 4 is a diagram of the fourth embodiment of an Adjustable Chair Exerciser

FIG. 4 is a simplified schematic view of one embodiment of a Chair Exerciser. The seat 40 is where the subject sits while exercising and, at the same time, may be working. The Chair Exerciser base 41 is configured to be placed on the current chair seat and supports the subject, whereas the seat 40 moves in an up/down arcuate motion. The Chair Exerciser seat rotates around the pivot 42. The spring 43, provides the support resistance in the downward motion, and, during the upward assist as the subject moves in the upward direction. The knob 45 provides adjustment for the resistance and motion speed, depending on the subject's weight and desired exercising effort. In one embodiment the knob 46 provides height and motion range adjustments. The seat 40 may include cushioning material to improve comfort. The base 41, may include non-slip function 41*a* such as extrusion, gripping material or straps. The Chair Exerciser may include vital sign sensor 48, and activity counter 49 and display 49A.

Figure 5:
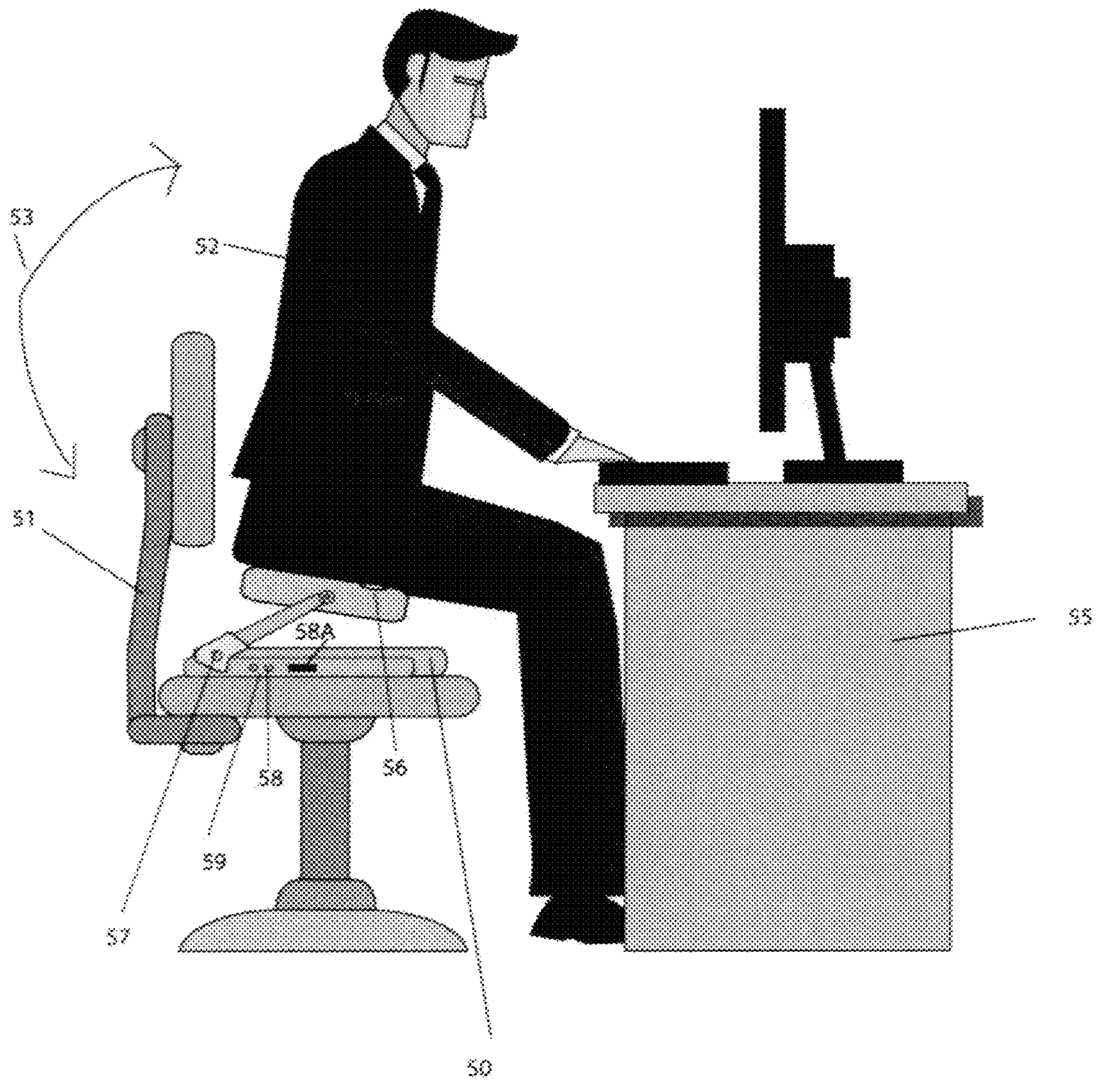
FIG. 5 is a side view of a portion of a Chair Exerciser operation to exercise the legs and core in accordance with the present invention.

FIG. 5 is a side view of one embodiment of a portion of the Chair Exerciser 50, including the chair 51 and the subject 52. The illustration depicts an individual working and exercising on the Chair Exerciser. In this embodiment, the subject 52 controls movement in an up and down oscillating manner, as indicated by arrow 53. More specifically, the subject 52 can control the frequency and/or amplitude of the movement relative to desk 55. In an alternative embodiment, the subject 52 can control movement in a direction that is different than a strictly up and down movement. For example, in non-exclusive alternative embodiments, the controller 57 can control movement of the arcuate, lateral, or an elliptical motion. The subject can also control the lateral velocity, direction of movement (indicated by arrow 53), and/or duration of movement by adjusting the control valve means 59. The Chair Exerciser may include vital sign sensor 56, activity counter 58, and display 58A.

Figure 6:
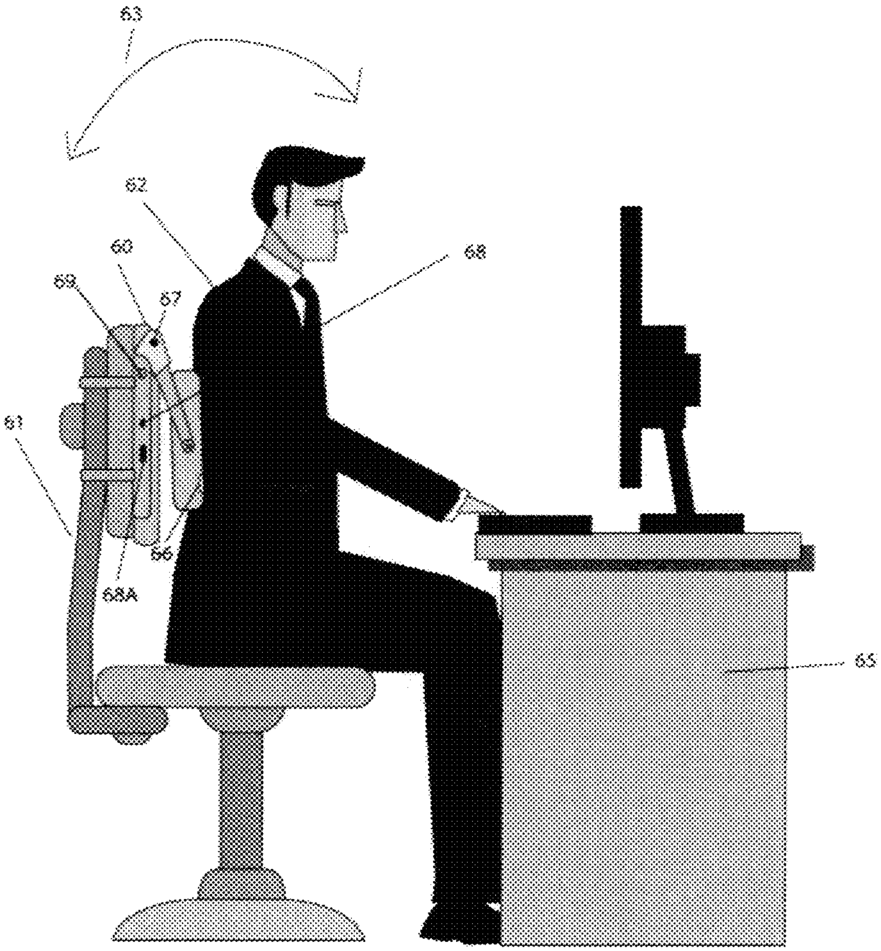
FIG. 6 is a chair integrated Adjustable Chair Exerciser to exercise the back and core in accordance with the present invention.

FIG. 6 is a side view of one embodiment of a portion of the Chair Exerciser 60, including the chair 61 and the subject 62, while exercising and/or working. In this embodiment, the subject controls movement in a forward/backward oscillating manner, as indicated by arrow 63. More specifically, the subject 62 can control the frequency and/or amplitude of the movement relative to desk 65. In an alternative embodiment, the subject 62 can control movement in a direction that is different than a strictly up and down movement. For example, in non-exclusive alternative embodiments, the controller 67 can control movement of the arcuate, lateral, or an elliptical motion. The subject can also control the lateral velocity, direction of movement (indicated by arrow 63), and/or duration of movement by adjusting the control valve means 69. The Chair Exerciser may include vital sign sensor 66, activity counter 68 and display 68A.

The specific design of the Chair Exerciser can vary to suit the design requirements, It can be made larger or smaller than these examples. It can be made of a variety of materials, as appropriate. Further, the spring can be formed from another suitable element or compound, provided the requisite can be obtained.

The size of the Chair Exerciser can likewise be varied. In one embodiment, approximately 14 inches by 14 inches×6 inches. Alternatively, the length, width and depth can be less than or greater than this.

Figure 7:
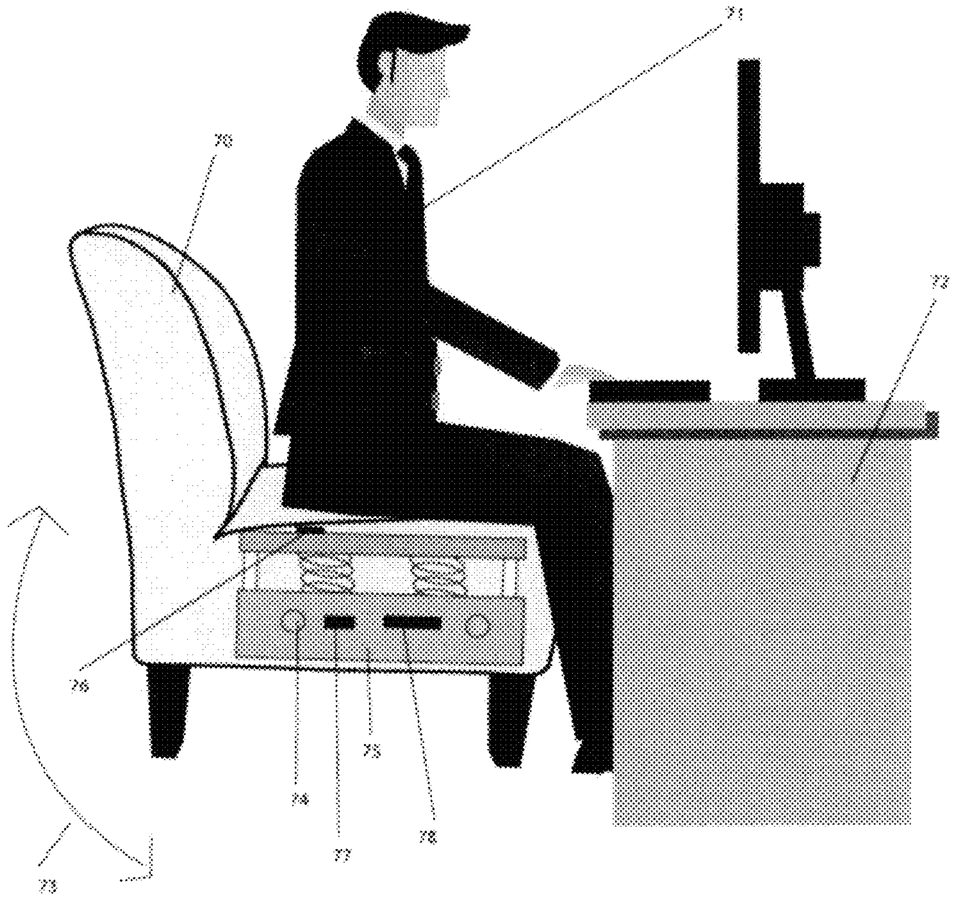
FIG. 7 Diagram of the embodiment of an Integrated Chair Exerciser in a chair.

FIG. 7 is a side view of one embodiment of a portion of the Chair Exerciser 75 integrated as part of the chair 70 and the subject 71, while exercising and/or working. In this embodiment, the subject 71 controls movement in an up and down oscillating manner, as indicated by arrow 73. More specifically, the subject 71 can control the frequency and/or amplitude of the movement relative to desk 72. In an alternative embodiment, the subject 71 can control movement in a direction that is different than strictly an up and down movement. For example, in non-exclusive alternative embodiments, the subject can control movement in an arcuate, lateral, or an elliptical motion. The subject can also control the lateral velocity, direction of movement (indicated by arrow 73), and/or duration of movement by adjusting the control valve means 74. The Chair Exerciser may include vital sign sensor 76, activity counter 77, and display 78.

Figure 8:
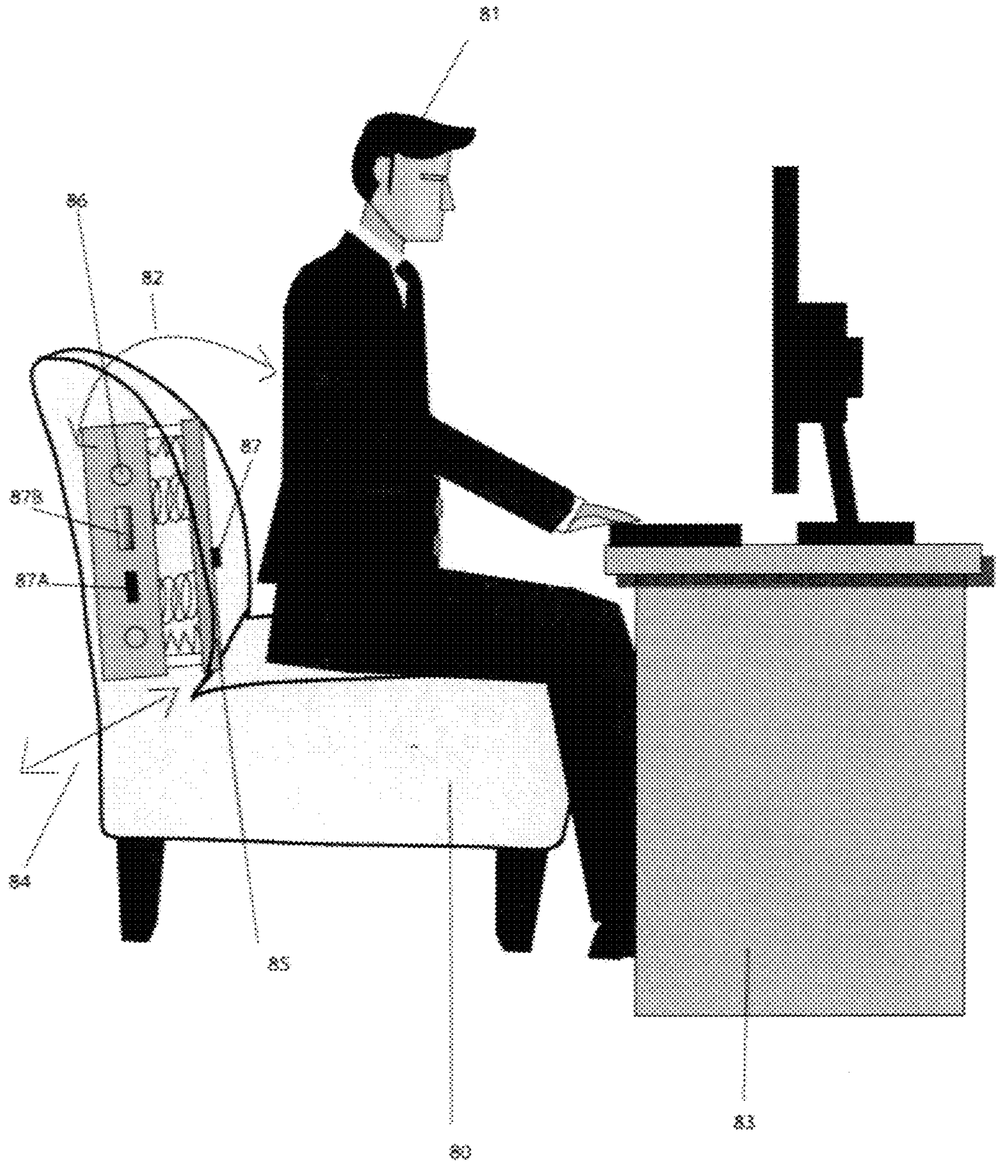
FIG. 8 Diagram of a second embodiment of an Integrated Chair Exerciser in a chair.

FIG. 8 is a side view of one embodiment of a portion of the Chair Exerciser 85 integrated as part of the chair 80 and the subject 81, while exercising and/or working. In this embodiment, the subject 81 controls movement in the forward/backward oscillating manner, as indicated by arrow 82. More specifically, the subject 81 can control the frequency and/or amplitude of the movement relative to desk 83. In an alternative embodiment, the subject 81 can control movement in a direction that is different than strictly the forward backward movement. For example, in non-exclusive alternative embodiments, the subject 81 can control movement of the arcuate, lateral, or an elliptical motion.

The subject can also control the lateral velocity, direction of movement (indicated by arrow 84), and/or duration of movement by adjusting the control valve means 86. The Chair Exerciser may include vital sign sensor 87, activity counter 87A, and display 87B.

Method to Monitor User's Vital Signs and Exercise Activity

A Sitting Exerciser may include functionality that monitors the user's vital signs, heart rate, pulse rate, blood pressure, weight, repetition count, and calories burned.

Method of Manufacture:

The Chair Exerciser may use well-known industry standard manufacturing techniques to manufacture parts, including, but not limited to plastic injected molding, steel springs, plastic springs, solenoids, and/or pneumatic valves. Furthermore, the Chair Exerciser may include assisted functions using hydraulics, pneumatics or electronic valve controls, counters to measure exercise activities, or motorized means to enable various control functions. The Chair Exerciser may include the functionality of measuring human vital signs, such as temperature, blood pressure, heart rate, pulse rate, weight, and others.

The size of the Chair Exerciser can likewise be varied. In one embodiment, approximately 14 inches by 14 inches×6 inches. Alternatively, the length, width and depth can be less than or greater than this.

Notwithstanding the specifications set forth above, the Chair Exerciser may vary as to the speed, resistance, frequency of oscillation, size, materials, or any other suitable or material component. Furthermore, the various embodiments can be combined or separate. It may be used to exercise in the sitting embodiment, the back embodiment and/or a combination of both.

Furthermore, the Chair Exerciser may include assisted functions using hydraulics, pneumatics or electronic valve controls, counters to measure exercise activities, or motorized means to enable various control functions. The Chair Exerciser may include the functionality of measuring human vital signs, such as temperature, blood pressure, heart rate, and others.

The Chair Exerciser allows the user to exercise while working.

While the particular Chair Exerciser, as herein shown and disclosed in detail is fully capable of obtaining the objectives and providing the advantages herein before stated, it is to be understood that it is merely illustrative of the presently preferred embodiments of the invention and no limitations are intended to the details of construction or design herein show, other than as described in the appended claims.

The Chair Exerciser may include a vital sign sensor, activity counter, and display.

What is claimed:

1. A chair exerciser that exercises the muscles of the user's legs, thighs, abdomen, buttocks, and back, said chair exerciser comprising:

a stationary base and a movable seat that are connected by a spring apparatus and an adjustable air bladder apparatus which operate independently from each other;

said spring apparatus is configured to provide support resistance in a downward motion of the seat and assistance in an upward motion;

said air bladder compresses during the downward motion of the seat and the air bladder controls the resistance with a valve that adjusts the air flow; when the valve is turned in a first direction, the air flow is reduced and the resistance increases; when the air valve is turned in an opposite direction, the resistance decreases; and an air reservoir and at least one valve configured to provide additional control and adjustments to assist the spring during the upward motion.

2. The Chair Exerciser of claim 1, wherein the Chair Exerciser is a separate apparatus configured to be placed on top of a chair seat.

3. The Chair Exerciser of claim 1, wherein the Chair Exerciser is a separate apparatus configured to be attached to the back of a chair.

4. The Chair Exerciser of claim 1, wherein the Chair Exerciser is configured to be formed as an integral part of a chair.

5. The Chair Exerciser of claim 1, having an activity counter.

6. The Chair Exerciser of claim 1, having a vital sign monitor.

7. A chair exerciser that exercises the muscles of the user's legs, thighs, abdomen, buttocks, and back, said chair exerciser comprising:

a stationary base configured to be placed on top of a chair seat or against a back of a chair;

a separate seat configured for a user to sit on or apply pressure to by a user's back, said seat is connected to said stationary base via a pivot arm that allows movement of the seat in an up/down arcuate motion about a pivot axis controlled by an adjustable spring apparatus coaxial with said pivot axis;

a height and an arcuate range of motion of the seat are adjustable depending on the user's height and exercise effort; the range of motion is reduced when a first knob is turned in a first direction, as it causes a screw to limit the movement of the seat; when turned in an opposite direction, the rotation is increased;

a spiral spring force is adjusted independently from the height and arcuate motion range by turning a second knob that increases or decreases the resistance to suit the user's weight and exercise effort.

8. The chair exerciser of claim 7, further comprising an exercise repetition counter.

9. The chair exerciser of claim 7, further comprising at least one vital sign monitor.

10. The chair exerciser of claim 9, wherein at least one vital sign monitor monitors pulse rate.

11. The chair exerciser of claim 9, wherein at least one vital sign monitor monitors blood pressure.

12. The chair exerciser of claim 9, wherein at least one vital sign monitor monitors weight.

13. The chair exerciser of claim 9, wherein at least one vital sign monitor monitors calories burned.

14. The chair exerciser of claim 9, wherein at least one vital sign monitor monitors pulse rate.

* * * * *